United States Patent [19]

Schneider et al.

[11] Patent Number: 4,817,014

[45] Date of Patent: Mar. 28, 1989

[54] DIGITAL CORRELATOR

[75] Inventors: Georg Schneider, Schopfheim-Langenau; Günter Freudig, Karlsruhe; Fernand Rippinger, Karlsruhe; Hans Braun, Karlsruhe, all of Fed. Rep. of Germany

[73] Assignee: Endress u. Hauser GmbH u. Co., Maulburg, Fed. Rep. of Germany

[21] Appl. No.: 94,826

[22] Filed: Sep. 9, 1987

[30] Foreign Application Priority Data

Oct. 3, 1986 [DE] Fed. Rep. of Germany ....... 3633769

[51] Int. Cl.$^4$ ............................................. G06F 15/34
[52] U.S. Cl. ................................. 364/728.03; 375/96
[58] Field of Search ................ 364/728, 819; 382/42; 375/96; 342/189

[56] References Cited

U.S. PATENT DOCUMENTS

| | | | |
|---|---|---|---|
| 3,407,289 | 10/1968 | Williams | 364/728 X |
| 3,479,495 | 11/1969 | Malm | 364/819 |
| 3,660,647 | 5/1972 | Pryor, Jr. | 364/728 |
| 4,025,775 | 5/1977 | Beauvais et al. | 235/181 |
| 4,097,801 | 6/1978 | Freeman et al. | 364/728 X |
| 4,121,297 | 10/1978 | Smith | 364/728 |
| 4,255,795 | 3/1981 | Hechtenberg | 364/728 |
| 4,285,046 | 8/1981 | Henry | 364/728 |

FOREIGN PATENT DOCUMENTS

80/01517 7/1980 Int'l Pat. Institute.
79/0001119 12/1979 World Int. Prop. O. .......... 364/819

Primary Examiner—Eugene R. LaRoche
Assistant Examiner—Seung Ham
Attorney, Agent, or Firm—Barnes & Thornburg

[57] ABSTRACT

A digital correlator for determining the offset time between two random signals offset in time with respect to each other includes an analog signal processing arrangement and a digital signal processing unit. The analog signal processing arrangement generates by binarizing and periodic sampling of the random signals and their derivatives binary signals, each of which represents the polarity of one of the random signals or the derivative of a random signal at the sampling instants. The digital signal processing unit includes two delay circuits, each of which imparts to one of the binary signals a delay of an adjustable multiple of the sampling period. Each delay circuit is formed by a write-read memory into the memory cells of which the consecutive bits of the binary signal to be delayed are written at the sampling rate under consecutive write memory addresses and out of the memory cells of which the stored bits are read at the sampling rate under consecutive read memory addresses differing from the write memory addresses by an adjustable address difference. Furthermore, the digital signal processing unit comprises two correlation units, each of which receives a delayed binary signal, an undelayed binary signal and a derivative binary signal corresponding to the derivative of the undelayed binary signal. Each correlation unit counts the sampling periods which are contained in an averaging time interval and in which a quantity calculated from the binary signals supplied assumes a positive numerical value or a negative numerical value. A computing and control circuit calculates from the two counts estimated values of correlation coefficients and their derivatives and controls the adjustable address difference in each delay circuit in dependence upon said estimated values so that the delay time is kept equal to the offset time.

13 Claims, 5 Drawing Sheets

DIGITAL CORRELATOR

The invention relates to a digital correlator for determining the offset time between two random signals time-offset with respect to each other comprising an analog signal processing arrangement which by binarizing and periodic sampling of the random signals and their derivatives generates binary signals of which each represents the polarity of one of the random signals or the derivative of a random signal at the sampling instants, and a digital signal processing unit including at least one dely circuit which imparts to one of the binary signals a delay of an adjustable multiple of the sampling period, and at least one correlation unit which receives undelayed and delayed binary signals and processes them to recover estimated values of correlation coefficients, and a computing and control unit which receives the output signals of the or each correlation unit and controls the delay tine in the delay circuit so that it is maintained equal to the offset time.

Correlators of this type are designated maximum-seeking correlators or also closed-loop or tracking correlators because they continuously regulate the adjustable delay time to the offset time to be measured. They thus differ from correlators which calculate the entire correlation function in a predetermined region of the delay time and then determine the position of the correlation maximum corresponding to the offset time sought.

In the known correlators the delay circuits are generally formed by shift registers. For adjusting the delay time either the shift register clock frequency can be changed or the shift register length with constant clock frequency.

Both possibilities have advantages and disadvantages. In the first case for the infinitely variable clock frequency a voltage-frequency converter is required which with the desired linear characteristic is relatively expensive. Furthermore, in the description of the control circuit the implicit offset time of the shift register must also be taken into account. It is not possible to adjust the delay time set abruptly because on an abrupt change of the clock frequency of the shift register it takes a further time dependent on the shift register length until the values sampled with the old clock frequency have been expelled from the shift register. A substantial advantage of this possibility is however that with transport processes where input signal bandwidth and offset time are coupled together via the clock frequency of the shift register a simple adaptation of the entire system to the input signal bandwidth is effected.

The advantage of changing the shift register length lies in that the voltage-frequency converter can be dispensed with and the delay time set can be varied abruptly. This second possibility is thus particularly suitable for discrete implementation of the control circuit. After the resetting of the delay time by changing the shift register length the output signal delayed by said new delay time is immediately available. Disadvantages of this second possibility are however, since the shift register length alone is used as measure of the offset time the limited resolution of the offset time and the necessary adaptation of the system to the input signals when the offset time changes.

The problem underlying the invention is the provision of a digital correlator of the type set forth at the beginning whose delay circuit with a very simple structure permits both a change of the shift register length in a very wide range and also a change of the sampling frequency in a wide frequency range.

According to the invention this problem is solved in that each delay circuit is formed by a write-read memory, into the memory cells of which the consecutive bits of the binary signal to be delayed are written at the sampling rate under consecutive write memory addresses and from the memory cells of which the stored bits are read out at the sampling rate under consecutive read memory addresses differing from the write memory addresses by an adjustable address difference.

The peculiarity of the digital correlator according to the invention is the replacement of the shift registers by a write-read memory which can be implemented for example by a 65,536 bit RAM. Contrary to the mode of operation of a normal digital shift register in which always the same memory cells is written to with the bits of the binary signal and the bits are passed on with every sampling cycle in this case the content of a memory cell just written to is retained. With the following sampling cycle the adjacent memory cell is written to. In each sampling cycle following the write operation a read operation also takes place but in a memory cell whose memory address differs by the settable address difference from the memory address of the memory cell written to in the same sampling cycle. The delay time set results from the address difference between the write memory address and the read memory address multiplied by the sampling period duration. The section of the write-read memory lying between the two memory addresses takes on the function of the shift register. By changing the address difference the apparent shift register length can be varied over the entire range of the write-read memory, i.e. in the numerical example given above from 0 to 65,536 memory cells. In addition, it is easily possible to change the sampling frequency and thus the clock pulse of the write and read cycles in the write-read memory. The digital correlator can thus be used for correlation of input signals whose frequencies and offset time change within a wide range.

A further advantageous development of the digital correlator according to the invention resides in that the or each correlation unit includes a drive logic and a counting arrangement, that the drive logic receives a delayed binary signal, an undelayed binary signal and a derivative binary signal corresponding to the derivative of the undelayed binary signal and controls the counting arrangement in dependence upon a quantity calculated by forming the product of the derivative binary signal and the difference of the two other signals, the two signal values of each binary signal having associated therewith a positive numerical value and a negative numerical value and accordingly the calculated quantity being able to assume only three numerical values, of which one numerical value is positive, the other numerical value negative and the third numerical value 0, that the control of the counting arrangement by the drive logic is such that it forms in a predetermined averaging time interval corresponding to a multiple of the sampling period two counts which depend on the number of sampling periods in which the calculated quantity has the positive or the negative numerical value, and that the counts reached after termination of the averaging time interval are supplied to the computing and control circuit which calculates therefrom estimated values of correlation coefficients and their derivatives.

This construction of the correlation unit makes it possible in very simple manner and in relatively short averaging time intervals to obtain directly estimated values of correlation coefficients which make it possible to regulate the adjustable delay time to the offset time sought. In particular, from the counts of the counting arrangement an estimated value of the derivative of the cross-correlation function can be obtained which as is known is the primary requirement in a maximum-seeking correlator for the regulation because at the offset time it has a zero passage and the direction of the control deviation is therefore apparent therefrom. However, it is also possible to obtain from the same counts an estimated value of the cross-correlation function itself and this is advantageous for monitoring the control loop.

A particularly advantageous further development of this embodiment resides in that the delay circuits and the correlation units are duplicated, different binary signals being applied to the two correlation units. Form the counts of the second correlation unit it is then possible to obtain additional estimated values which provide information on the properties of the process investigated or permit further improvements of the measurements.

Further advantageous developments and embodiments of the digital correlator according to the invention are characterized in the subsidiary claims.

An example of embodiment of the invention will be described with the aid of the drawings, wherein.

Figure 1:
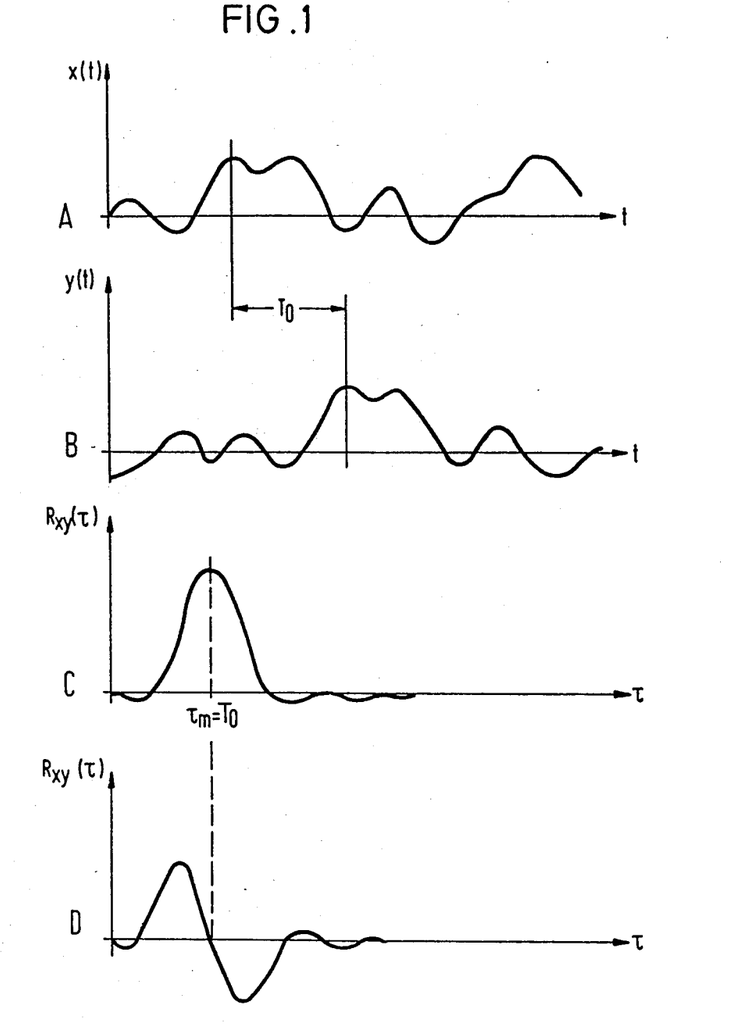
FIG. 1 shows diagrams to explain the offset time measurement by correlation.

The diagram A of FIG. 1 shows a random analog signal x(t) and diagram B shows a random analog signal y(t) which has certain similarities with the signal x(t) but is displaced by a time $T_0$ with respect to the analog singal x(t). In various areas of measuring technology it is necessary to determine the delay time $T_0$ between two similar random signals offset with respect to each other in this manner. For example, the two signals x(t) and y(t) could come from two sensors which are arranged spaced from each other along the path of movement of a moving medium and respond to random irregularities of a physical parameter of the medium. In this case the time $T_0$ corresponds to the travelling time of the medium from the first to the second sensor and the similarity of the signals originates from the same irregularities firstly generating the signal x(t) in the first sensor and after a travelling time $T_0$ generating the signal y(t) in the second sensor. The two signals x(t) and y(t) may however also be caused by waves originating from the same source but reaching the two sensors after convering paths of different lengths. In this case the time $T_0$ is equal to the travelling time difference of the waves. For simplification the time $T_0$, irrespective of its cause, will be referred to in the following description as "offset time".

A known method of measuring the offset time $T_0$ resides in determining the maximum of the cross-correlation function between the two signals x(t) and y(t). The cross-correlation function is of course given by the following formula:

$$R_{xy}(\tau) = \frac{1}{T} \int_0^T x(t - \tau) y(t) \, dt \quad (1)$$

This formula means that the values of the signal y(t) in a time section of duration T are multiplied by the values of the signal x(t) delayred by a delay time $\tau$ and by integration over the time T the mean value of the products is formed. The result obtained is a support value of the cross-correlation function for the delay time $\tau$ employed. If the same computing operation is repeated for various values of $\tau$ and the support values obtained plotted as a function of $\tau$ the cross-correlation function $R_{xy}(\tau)$ illustrated in diagram C of FIG. 1 is obtained. It has a maximum at a delay time $\tau_m$ which is equal to the offset time $T_0$.

The diagram D of FIG. 1 shows the derivative of the cross-correlation function $R_{xy}(\tau)$ of diagram C. It is obtained in that the values of the signal x(t) delayed by the various delay times $\tau$ are not multiplied by the values of the signal y(t) but by the values of the derivative $\dot{y}(t)$ of the signal y(t). The derivative thus obtained of the cross-correlation function is therefore designated as $R_{x\dot{y}}(\tau)$. The derivative $R_{x\dot{y}}(\tau)$ passes through zero at the delay time $\tau_m = T_0$. It has different signs on either side of the zero passage and this shows the direction of a deviation. The derivative $R_{x\dot{y}}(\tau)$ is therefore suitable with particular advantage for maximum-seeking correlators which by regulation seek to keep the delay time $\tau$ at the instant $\tau_m = T_9$.

Figure 2:
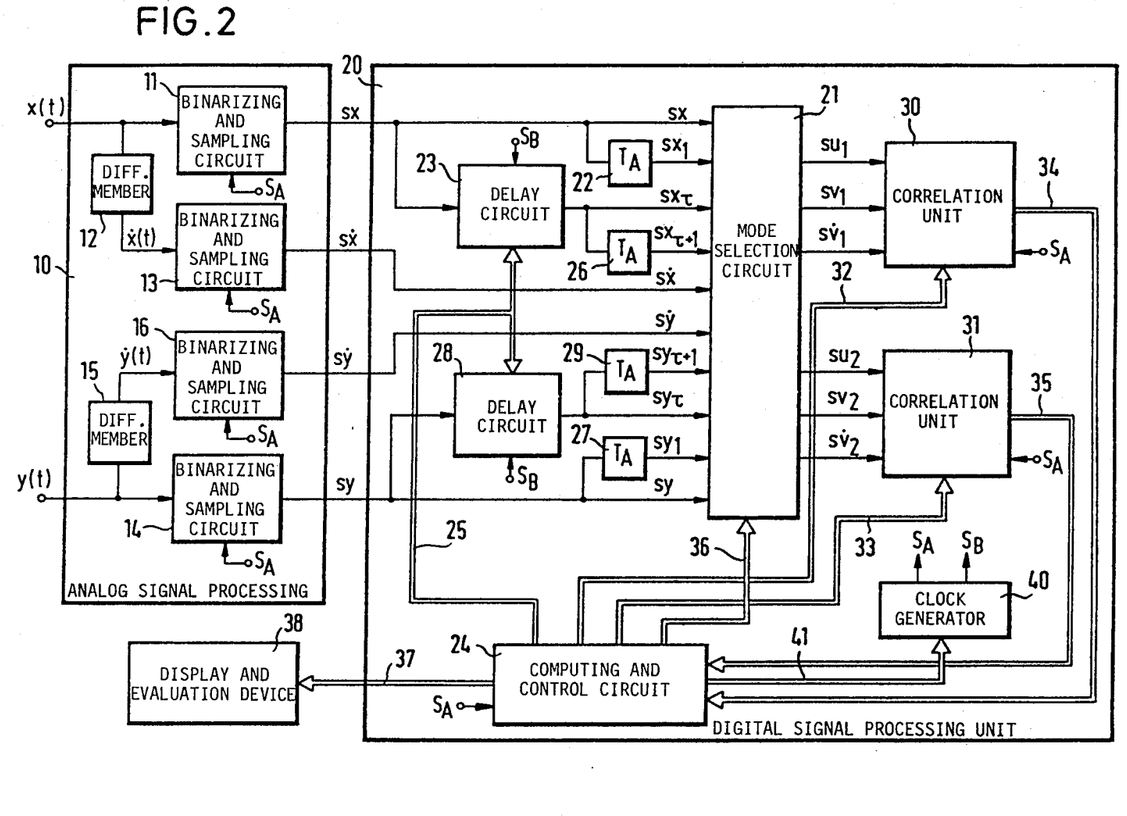
FIG. 2 is a block circuit diagram of the digital correlator according to the invention.

FIG. 2 shows the block circuit diagram of a digital correlator for determining the offset time $T_0$ between two signals x(t) and y(t) by evaluating the cross-correlation function and its derivative. The correlator of FIG. 2 has the following features:

Not all the analog signals x(t) and y(t) are correlated but sampled values which are obtained at regular time intervals $T_A$ from the analog signals.

The sampled values are binarized, i.e. converted to digital signals with a single bit. Each sampled value thus contains no information on the amplitude of the analog signal at the sampling instant but only shows whether the analog signal was positive or negative at the sampling instant. Thus, these are pure sign or polarity signals. A correlator made to process such signals is therefore referred to also as polarity correlator.

Although in principle the correlator of FIG. 2 could also calculate a complete cross-correlation function and then determine the maximum of the cross-correlation function in order to find the ofsett time $T_0$, in the description of the example of embodiment it is assumed that it regulates the delay time $\tau$ so that it is continuously kept at the value $\tau_m$ corresponding to the offset time $T_0$. This is thus a maximum-seeking correlator or a one point correlator which is also known under the name of closed-loop correlator or tracking correlator.

The correlator of FIG. 2 consists mainly of an analog signal processing circuit 10 a digital signal processing unit 20. The analog signal processing arrangement 10 serves to generate from the two analog signals x(t) and y(t) the binary signals representing the binarized sampled values. The binary signal x(t) is supplied to a binarizing and sampling circuit 11 to which is also applied a periodic clock signal $S_A$ defining the sampling rate and having the sampling period $T_A$ and the sampling frequency $f_A$. The binarizing and sampling circuit 11 furnishes at the output a binary signal sx which assumes the signal value 1 when the analog signal x(t) is positive at the sampling instant whilst it assumes the signal value 0 when the analog signal x(t) is negative at the sampling instant.

The analog signal x(t) is further supplied to a differentiating member 12 which furnishes at the output an analog signal $\dot{x}(t)$ which corresponds to the derivative of the analog signal x(t). Connected to the output of the differentiating member 12 is a binarizing and sampling circuit 13 which is constructed in the same manner as the binarizing and sampling circuit 11 and likewise receives the clock circuit $S_A$. The binarizing and sampling circuit 13 thus furnishes at the output a binary signal sx̀ which at each sampling instant assumes the signal value 1 or 0 corresponding to the sign of the derivative $\dot{x}(t)$.

In corresponding manner the analog signal y(t) is supplied to a binarizing and sampling circuit 14 and a differentiating member 15. The binarizing and sampling circuit 14 furnishes at the output a binary signal sy which assumes at each sampling instant the signal valuee 1 or 0 which corresponds to the sign of the signal y(t). The differentiating member 15 furnishes at the output the analog derivative signal $\dot{y}(t)$ which is supplied to a binarizing and sampling circuit 16. The binarizing and sampling circuit 16 furnishes at the output a binary signal sỳ which assumes at each sampling instant the signal 1 or 0 corresponding to the sign of the derivative signal $\dot{y}(t)$.

The binary signals sx, sẋ, sy and sẏ furnished by the binarizing and sampling circuits 11, 13, 14 and 16 are transferred from the analog signal processing circuit 10 to the digital signal processing unit 20.

The digital signal processing unit 20 includes a mode selection circuit 21 which receives the binary signal sx directly at a first input. The binary signal sx is also applied to a delay member 22 which furnishes at the output a binary signal $sx_1$ which is delayed by a sampling period $T_A$ with respect to the binary signal sx. The output of the delay member 22 is connected to a second input of the mode selection circuit 21.

Finally, the binary signal x(t) is supplied to a delay circuit 23 which furnishes at the output a binary signal $sx_\tau$ which is delayed compared with the input signal x(t) by an adjustable delay time $\tau$ which is an integer multiple $K \cdot T_A$ of the sampling period $T_A$. The delay time $\tau = K \cdot T_A$ is determined by a computing and control circuit 24 which via a data bus (represented by a double line) sends to the delay circuit 23 a data word which indicates the delay time to be set. The makeup and mode of operation of the delay circuit 23 will be explained in detail hereinafter.

The delayed binary signal sx emitted at the output of the delay circuit 23 is supplied to a third input of the mode selection circuit 21. Also, to the output of the delay circuit 23 a delay member 26 is connected which furnishes at the output a binary signal $sx_{\tau+1}$ which is delayed with respect to the binary signal $sx_\tau$ by a further sampling period $T_A$. The output of the delay member 26 is connected to a fourth input of the mode selection circuit 21.

A fifth input of the mode selection circuit 21 receives the binary signal sẋ directly from the analog signal processing arrangement 10.

A completely identical circuit group is provided for the binary signals derived from the analog signal y(t). The binary signal sy is directly supplied to a sixth input of the mode selection circuit 21. A delay member 27 receives the binary signal sy and supplies to a seventh input of the mode selection circuit 21 a binary signal $sy_1$ which is delayed with respect to the binary signal sy by a sampling period $T_A$. A delay circuit 28 completely identical to the delay circuit 23 also receives the binary signal sy and supplies to an eighth input of the mode selection circuit 21 a binary signal $sy_\tau$ which is delayed with respect to the binary signal sy by the delay time $\tau = K \cdot T_A$ governed by the computing and control circuit 24. The delayed binary signal $sy_\tau$ is delayed by a delay member 29 by an additional sampling period $T_A$, thus giving a binary signal $sy_{\tau+1}$ which is supplied to a ninth input of the mode selection circuit 21. Finally, a tenth input of the mode selection circuit 21 receives the binary signal sẏ directly.

The digital signal processing unit 20 further includes two correlation units 30 and 31. Each correlation unit has three signal inputs which are connected to three associated outputs of the mode selection circuit 21. Each correlation unit 30, 31 further receives via a data bus 32 and 33 respectively from the computing and control circuit data for controlling its operation. In addition, the clock signal $S_A$ is applied to each correlation unit 30 and 31. The output of each correlation unit 30, 31 is connected via a data bus 34 and 35 respectively to an associated input of the control and evaluation circuit 24.

The mode selection circuit 21 is a switching matrix which depending on the mode set selects specific binary signals from the binary signals applied to its ten inputs and transfers them at its six outputs to the two correlation units 30 and 31. The mode is defined by control signals which are supplied by the control and evaluation circuit 24 via a control line 36 to the mode selection circuit 21. The three binary signals which are supplied to the correlation unit 30 are denoted by $su_1$, $sv_1$ and $s\dot{v}_1$ and the three binary signals supplied to the correlation unit 31 are denoted by $su_2$, $sv_2$ and $s\dot{v}_2$. In Table I at the end of the description it is indicated for five different modes which input binary signals are applied to the correlation unit 30 as binary signals $su_1$, $sv_1$, $s\dot{v}_1$ and which input binary signals are simultaneously applied as binary signals $su_2$, $s\dot{v}_2$ and $sv_2$ to the correlation unit 31. As apparent from this table in each of the modes the binary signal su is a delayed binary signal, the binary signal sv an undelayed binary signal and the binary signal sv̇ the derivative binary signal corresponding to the undelayed binary signal. As required, further modes may be provided.

The computing and control circuit 24 which may be formed for example by an appropriately programmed microcomputer evaluates the output signals of the correlation units 30 and 31 supplied via the data buses 34 and 35 and in accordance with the result of this evaluation via the data bus 25 adjusts the delay time $\tau = K \cdot T_A$ in the two delay circuits 23 and 28 in such a manner that said delay time corresponds to the maximum of the cross-correlation function. The delay time $\tau$ is then equal to the offset $T_0$ to be measured. If the offset time $T_0$ changes the delay time $\tau$ is continously regulated to the offset time $T_0$. The measured value of the offset time $T_0$ represented by the delay time $\tau = K \cdot T_A$ set is supplied via a data bus 37 to a display and evaluation device 38 in which the measured value can be displayed and evaluated in another manner, for example for control purposes.

Finally, the digital signal processing unit 20 also includes a clock generator 40 which generates the clock signals necessary for synchronized operation of the various circuits. In particular, the clock generator 40 generates the sampling clock signal $S_A$ with the sampling period $T_A$ and the sampling frequency $f_A$ which is supplied to the binarizing and sampling circuits 11, 13, 14 and 16 in the analog signal processing arrangement 10 and to the two correlation units 30 and 31. The sampling clock signal $S_A$ also synchronizes the operation of the computing and control circuit 24. In addition the clock generator 40 generates clock signals $S_B$ which control the operation of the delay circuits 23 and 28, as will be explained hereinafter. For simplification in the block circuit diagram the lines via which the clock signals are transmitted are not illustrated but instead at the clock inputs of the various circuits it is indicated which clock signal is applied.

The frequency of the sampling clock signal $S_A$ furnished by the clock generator 40 is adjustable within a wide range. The adjustment can for example be done by the computing and control circuit 24 via a control line 41. In so far as is necessary the clock generator 40 also adapts the frequency of the clock signals $S_B$ to the frequency $f_A$ of the sampling clock signal $S_A$.

A peculiarity of the digital signal processing unit 20 resides in the configuration of the two delay circuits 23 and 28. Each delay circuit contains a write-read memory, known in the literature also as RAM ("Random Access Memory"). The signal delay by the adjustable delay time $\tau = K \cdot T_A$ is obtained by a special cyclic addressing of the write-read memory.

For better understanding the function principle of the delay circuit 23 will be explained with the aid of the highly simplified illustration of FIG. 3. This explanation also applies of course in similar manner to the delay circuit 28.

FIG. 3 again shows the connection via which the binary signal sx is transmitted directly to the mode selection circuit 21 and by which the same binary signal sx is also supplied to the input of the delay circuit 23. Furthermore, FIG. 3 shows the connection from the output of the delay circuit 23 via which the delayed signal $sx_\tau$ is transmitted to the mode selection circuit 21, and the two delay members 22 and 26 which impart to the binary signal sx and the binary signal $sx_\tau$ respectively a delay of one sampling period $T_A$. As illustrated each of said delay members may be formed by a D flip-flop which receives the binary signal to be delayed at the D input and the sampling clock signal $S_A$ at the clock input.

The delay signal 23 contains a cyclically addressed write-read memory 50 whose individually addressable bit memory cells are arranged symbolically in a circle and for simplification only a small number of memory cells is illustrated. In reality the write-read memory may for example have a memory capacitance of $2^{16} = 65,536$ bits (64K bits).

A write pointer 51 denotes the memory cell into which a bit of the binary signal sx is written in a sampling cycle of duration $T_A$ and a read pointer 52 denotes the memory cell out of which a stored bit is read in the same sampling cycle. The position of the write pointer 51 is governed by the count of an address counter 53 which is cyclically advanced by the sampling clock signal $S_A$. The count of the address counter 53 indicates the address of the memory cell into which a bit is written. If the count capacity of the address counter 53 is equal to the number of memory cells (i.e. $2^{16}$ in the example given) the cyclic property is obtained by the overflow of the address counter. Otherwise the address counter is reset to the initial state on reaching the last memory address.

The write pointer 51 is thus shifted in each sampling cycle by one memory cell so that the consecutive bits of the binary signal sx are written consecutively into memory cells with consecutive addresses. It is assumed in FIG. 3 that the write pointer 51 circulates anticlockwise.

The position of the read pointer 52 is defined by the output signal of an adder circuit 54 which adds the content of an address difference register 55 to the count of the address counter 53. When the number in the address difference register 55 has the value K the output signal of the adder circuit 54 denotes the Kth memory cell following the memory cell denoted by the write pointer 51. The reading is thus effected in a memory cell which was written to K sampling cycles earlier. The readout bit is thus delayed by $K \cdot T_A$ compared with the instant of the writing in.

The numerical value K is entered by the computing and control circuit 24 via the data bus 25 into the address difference register 55. As long as said number K remains unchanged the read pointer 52 trails the write pointer 51 at a constant interval. If the number K is changed by the computing and control circuit 24 the spacing between the write pointer 51 and the read pointer 52 changes and this leads to a corresponding change in the delay time $K \cdot T_A$ which the binary signal $sx_\tau$ read out of the write-read memory 23 has compared with the binary signal sx.

If the address counter 53 is an up counter incrementing its count by one unit for each clock pulse of the sampling clock signal $S_A$ the contents of the address difference register 55 must be added in the adder circuit 54 to the count of the address counter 53 with negative sign so that the read address is K lower than the write address. If however the address counter 53 is a down counter the contents of the address difference register 55 must be added in the adder circuit 54 with positive sign to the count of the address counter 53 so that the read address is K higher than the write address.

Figure 3:
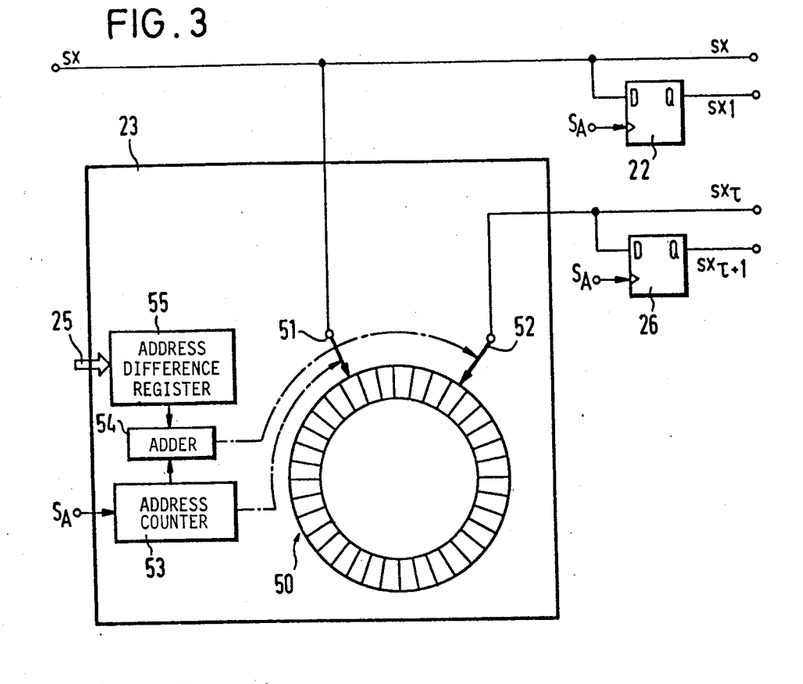
FIG. 3 is a basic diagram to explain the mode of operation of a delay circuit in the digital correlator of FIG. 2.

With the aid of FIG. 3 the conditions can also be explained which occur when the sampling frequency $f_A$ changes. The bits written with the new sampling frequency do not appear at the read pointer 52 until the latter reaches the memory address at which the write pointer 51 stood at the instant of the frequency change. For example if the address difference in the discrete control cycle reaches a value which is greater than 65,536 the computing and control circuit enforces halving of the sampling frequency $f_A$ with simultaneous halving of the address difference. However, it now takes a number of clock periods of the new sampling frequency corresponding to the halved address difference until correct sampled values of the input signal corresponding to the set delay time are again read out. Account must be taken of this when programming the algorithm for estimating the offset time.

Figure 4:
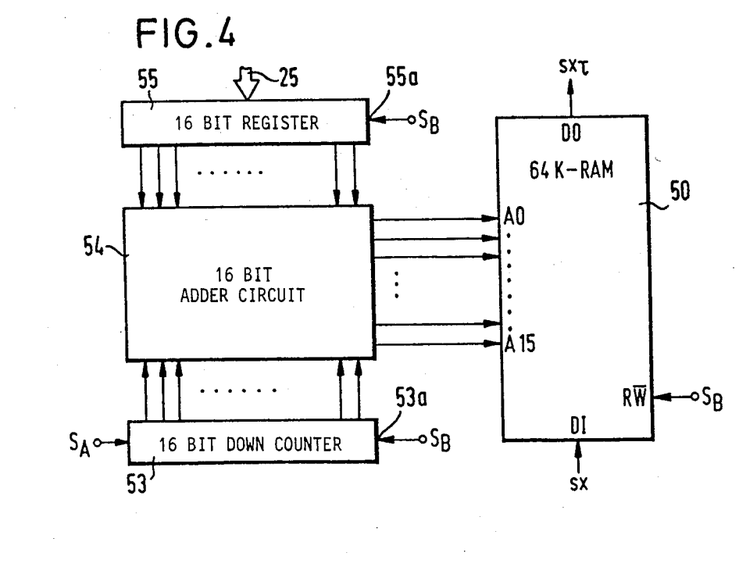
FIG. 4 shows the block circuit diagram of an embodiment of the delay circuit.

FIG. 4 shows in very simplified form a practical example of embodiment of the delay circuit 23, the principle of which has been explained with reference to FIG. 3. The write-read memory 50 is a 64K RAM with $2^{16} = 65,536$ memory cells, each of which can store one bit. The memory cells are individually addressable so that each memory address can be represented by a 16 bit binary word. The memory cells can for example be arranged in 256 rows and 256 columns so that each memory address consists of a row address of eight bits and a column address of eight bits; however, the memory organization is not essential to the understanding of the mode of operation.

A control signal contained in the clock signals $S_B$ and applied to a write-read control input $R\overline{W}$ determines whether at the memory address defined by the address signals the bit of the binary signal sx applied to the data input DI is written in or whether the bit stored at said memory address is read out and output at the data output DO as delayed binary signal $sx_T$.

The address counter 53 consists of a 16 bit down counter whose count is decremented by one by the sampling clock signal applied to its counting input in each sampling cycle $T_A$. The outputs of the 16 counter stages are connected to the first input group of the 16 bit adder circuit 54. These connections are either inhibited or enabled by a control signal which is applied to a control input 53a of the address counter 53 and is contained in the clock signals $S_B$.

The address difference register 55 is a 16 bit register into which the address difference number K of 16 bits is entered via the data bus 25. The outputs of the 16 register stages are connected to the second input group of the 16 bit adder circuit 54. These connections are either inhibited or enabled by a control signal which is applied by a control input 55a of the address difference register 55 and which is contained in the clock signals $S_B$.

The outputs of the adder circuit 54 are connected to the address inputs A0, A1 . . . A15 of the write-read memory 50.

By control signals applied to the various control inputs the operation of the circuit is controlled in such a manner that in each sampling period $T_A$ the following operational cycle results:

At the start of the sampling period the count of the 16 bit counter 53 is decremented by one unit by a clock pulse of the sampling clock signal $S_A$.

A write cycle now follows which is determined by the control signal at the input $R\overline{W}$ of the write-read memory 50 assuming the state defining the writing. The control signal at the control input 53a of the 16 bit counter 53 initiates the transfer of the binary signal values in the counter stages to the adder circuit 54. On the other hand the transfer of the binary signal values from the 16 bit register 55 to the adder circuit 54 is inhibited; the corresponding inputs of the adder circuit at the signal value 0. The adder circuit 54 therefore applies unchanged to the address inputs A0 . . . A15 of the write-read memory 50 the address located in the address counter 53. The bit of the binary signal sx lying at the data input DI of the write-read memory 50 is thus written into the memory cell which is defined by the memory address present in the address counter 53.

Finally a read cycle follows which is determined by the control signal at the input $R\overline{W}$ of the write-read memory 50 assuming the state defining reading. The control signal at the control input 53a of the address counter 53 again initiates the transfer of the signal values present in the counter stages to the corresponding inputs of the adder circuit 54 but now at the same time the control signal applied to the control input 55a of the address difference register 55 also effects the transfer of the signal values present in the register stages to the other inputs of the adder circuit 54. The adder circuit 54 therefore applies to the address inputs A0 . . . A15 of the write-read memory 50 a binary number corresponding to the sum of the two binary numbers applied to its inputs. Said binary number defines the address of the memory cell from which the stored bit is read, said bit being output at the data output DO of the write-read memory 50.

This operational cycle is repeated in each sampling period. It may of course in a manner known to any expert by modified in accordance with the type of write-read memory used. Thus, it is known to save terminal pins to provide only eight address inputs so that the memory addresses must be applied in two groups each of eight bits consecutively in time multiplex. If the write-read memory is a dynamic memory refresh cycles must possibly also be introduced to prevent the memory contents from being lost.

Figure 5:
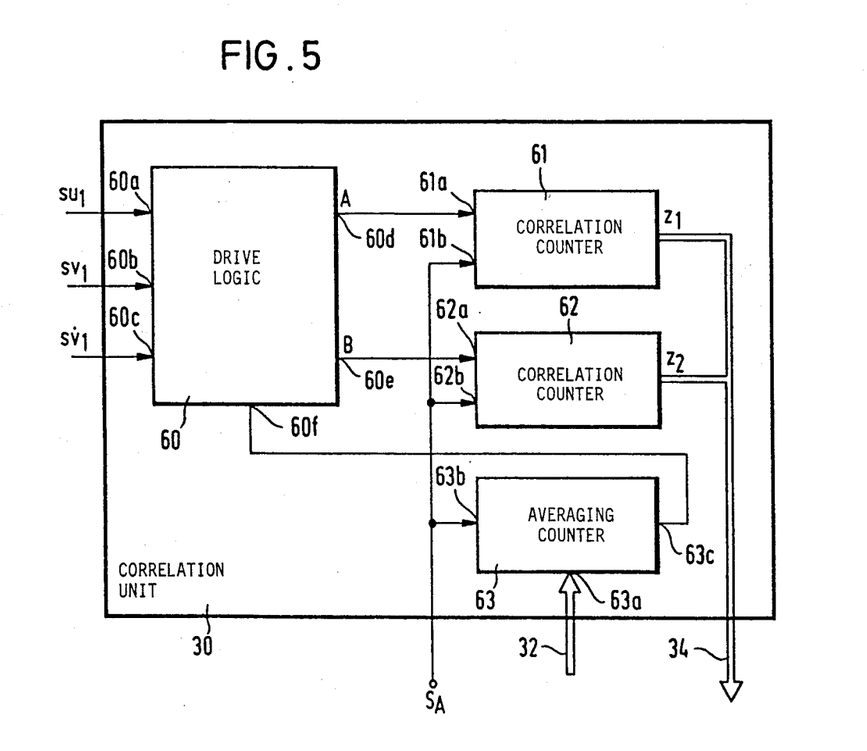
FIG. 5 shows the block circuit diagram of a correlation unit in the digital correlator of FIG. 2

FIG. 5 shows the block circuit diagram of the correlation unit 30. The two correlation units 30 and 31 have the same structure and the same mode of operation; the following description therefore also applies in identical manner to the correlation unit 31.

The correlation unit 30 includes a drive logic 60, two correlation counters 61, 62 and an averaging counter 63. The drive logic 60 has three signal inputs 60a, 60b, 60c to which the binary signals $su_1$, $sv_1$ and $s\hat{v}_1$ selected by the mode selection circuit 21 are applied. A first output 60d of the drive logic 60 is connected to the enable input 61a of the correlation counter 61 to the counting input 61b of which the sampling clock signal $S_A$ is applied. A second output 60e of the drive logic 60 is connected to the enable input 62a of the correlation counter 62 to the counting input of which the sampling clock signal $S_A$ is also applied. The averaging counter 63 has a preset input 63a at which via the data bus 32 a predetermined count can be set. Its counting input 63b receives the sampling clock signal $S_A$. An output 63c of the averaging counter 63 is connected to a control input 60f of the drive logic 60. The function of the drive logic 60 is based on the calculation of a quantity $\epsilon$ from the binary input signals $su_1$, $sv_1$ and $s\hat{v}_1$ in accordance with the following formula:

$$\epsilon = (su_1 - sv_1) \cdot s\hat{v}_1 \tag{2}$$

Allocated to the two signal values of each binary signal are not the numerical values 1 and 0 but the numerical values +1 and −1. The quantity $\epsilon$ can therefore assume only three possible values, +2, 0 and −2, as shown by Table II attached to the end of the description.

The drive logic 60 furnishes at the output 60d a binary signal A which has the signal value 1 only when the quantity $\epsilon$ has the value +2 whilst it otherwise has the signal value 0. The two binary signals A and B can be formed in the drive logic 60 directly by digital linking of the binary signals $su_1$, $sv_1$ and $s\hat{v}_1$ in accordance with a truth table attached as Table III to the end of the description. On the basis of his knowledge of the art any expert can readily implement a digital logic circuit fulfilling this truth table.

Signal A enables the counting of the clock pulses of the sampling clock signal $S_A$ in the correlation counter 62 only when it has the signal value 1. In corresponding manner signal B enables the counting of the clock pulses of the sampling clock signal $S_A$ in the correlation counter 62 only when it has the signal value 1. The averaging counter 63 continuously counts the clock pulses of the sampling clock signal $S_A$ until the count m set at the preset input 63a via the data bus 32 is reached. After counting m sampling clock pulses $S_A$ the signal furnished at the output 63c and applied to the control input 60f of the drive logic 60 blocks the further enabling of the correlation counter 61 and 62 by the signals A and B. The averaging counter 63 thus determines an averaging time interval from m sampling periods $T_A$.

After termination of the averaging time interval the count $z_1$ of the correlation counter 61 indicates the number of sampling periods contained in the averaging time interval in which the quantity ε had the value +2 and the count $z_2$ of the correlation counter 62 indicates the number of the sampling periods contained in the averaging time interval in which the quantity ε had the value −2. The two counts $z_1$ and $z_2$ are transferred via the data bus 34 to the computing and control circuit 24.

Figure 6:
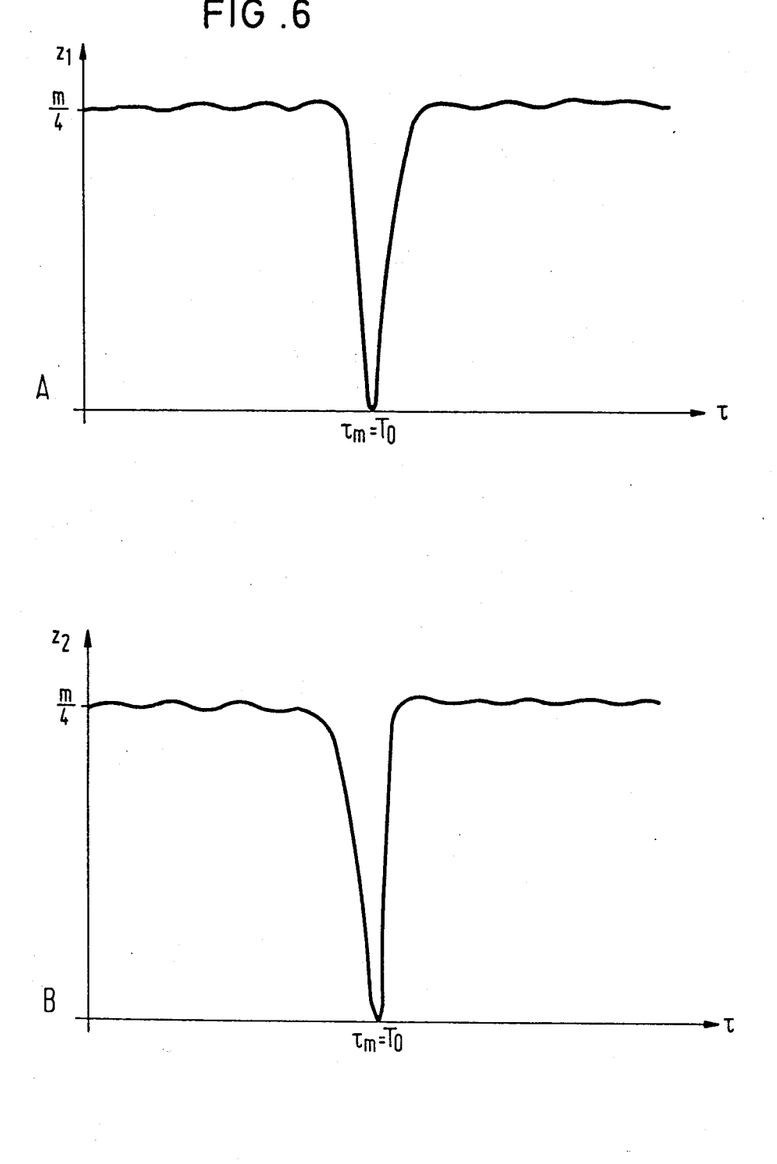
FIG. 6 shows diagrms of the counts contained in the correlation unit of FIG. 5.

The diagrams A and B of FIG. 6 show the variation of the counts $z_1$ and $z_2$ respectively as a function of the delay time $\tau = K \cdot T_A$ set in the delay circuit 23 for the case of completely correlated analog signals x(t) and y(t). Each count curve has at the point $\tau_m = T_0$ the value 0 and from this point increases towards both sides relatively steeply to the value m/4 which is substantially retained over the entire remaining region. The meaning of these curves is: The probability that the quantity ε assumes the values +2 and −2 is practically zero when the delay time $\tau = K \cdot T_A$ set in the delay circuit 23 is equal to the offset time $T_0$. If however the delay time $\tau = K \cdot T_A$ set is different beyond a certain area from the offset time $T_0$ the quantity ε assumes both the value +2 and the value −2 with the average frequency m/4. This probability is also apparent from Table II where each of the correct cases corresponds to a quarter of the possible cases. If the analog signals x(t) and y(t) are not completely correlated the count curves at the point $\tau_m = T_0$ do not go to zero but they do have at this point a minimum.

It can be shown that the computing and control circuit 24 can calculate from the counts $z_1$ and $z_2$ both an estimated value for the correlation coefficients $R_{uv}(\tau)$ and an estimated value for the derivative $R_{u\dot{v}}(\tau)$ for the delay time τ set in accordance with the following formulae:

$$R_{uv}(\tau) = 1 - 2\frac{z_1 + z_2}{m} \quad (3)$$

$$R_{u\dot{v}}(\tau) = 2\frac{z_1 - z_2}{m} \quad (4)$$

The meaning of the estimated values thus calculated depends on the binary signals selected by the mode selection circuit 21 and applied to the correlation unit. In the Table I attached to the end of the description for each mode the measurement results are therefore indicated which can be obtained from the counts $z_1$ and $z_2$ of each of the two correlation units 30 and 31. These figures also show the advantages which result from the duplicated structure with two delay circuits and two correlation units.

The following remarks are made on the individual modes:

Mode 1:

In mode 1 the cross-correlation function $R_{xy}(\pm\tau)$ and its derivative $\dot{R}_{xy}(\pm\tau)$ can be determined in both directions. In process in which the flow direction can alternate the direction is detected without additional measuring and computing expenditure. In closed-loop operation this mode is used during the start value search. As soon as the delay time τ has approached the offset time $T_0$ to such an extent that the correlation of the signals is sufficient for closed-loop operation a change is made to one of the other modes.

Modes 2 and 3:

Depending on the flow direction in the closed-loop operation for the actuating tracking operation mode 2 or mode 3 is set. Then, by means of the one correlation unit the value of the derivative $\dot{R}_{xy}(\tau)$ of the cross-correlation function required for adaption of the adjustable delay time in the delay circuits to the instantaneous offset time $T_0$ is measured. At the same time to monitor the control loop the value of the cross-correlation function $R_{xy}(\tau)$ is measured. By means of the other correla-

TABLE I

| Mode | Correlation unit 30 | | | | | Correlation unit 31 | | | | |
|---|---|---|---|---|---|---|---|---|---|---|
| | $su_1$ | $sv_1$ | $s\dot{v}_1$ | $R_{u_1v_1}$ | $R_{u_1\dot{v}_1}$ | $su_2$ | $sv_2$ | $s\dot{v}_2$ | $R_{u_2v_2}$ | $R_{u_2\dot{v}_2}$ |
| 1 | $sx_\tau$ | sy | $s\dot{y}$ | $R_{xy}(\tau)$ | $R_{x\dot{y}}(\tau)$ | $sy_\tau$ | sx | $s\dot{x}$ | $R_{yx}(\tau)$ | $R_{y\dot{x}}(\tau)$ |
| 2 | $sx_\tau$ | sy | $s\dot{y}$ | $R_{xy}(\tau)$ | $R_{x\dot{y}}(\tau)$ | $sy_1$ | sy | $s\dot{y}$ | $R_{yy}(T_A)$ | $R_{y\dot{y}}(T_A)$ |
| 3 | $sy_\tau$ | sx | $s\dot{x}$ | $R_{yx}(\tau)$ | $R_{y\dot{x}}(\tau)$ | $sx_1$ | sx | $s\dot{x}$ | $R_{xx}(T_A)$ | $R_{x\dot{x}}(T_A)$ |
| 4 | $sx_\tau$ | sy | $s\dot{y}$ | $R_{xy}(\tau)$ | $R_{x\dot{y}}(\tau)$ | $sx_{\tau+1}$ | sy | $s\dot{y}$ | $R_{xy}(\tau+T_A)$ | $R_{x\dot{y}}(\tau+T_A)$ |
| 5 | $sy_\tau$ | sx | $s\dot{x}$ | $R_{yx}(\tau)$ | $R_{y\dot{x}}(\tau)$ | $sy_{\tau+1}$ | sx | $s\dot{x}$ | $R_{yx}(\tau+T_A)$ | $R_{y\dot{x}}(\tau+T_A)$ | tion unit the value of the autocorrelation function $R_{xx}(T_A)$ or $R_{yy}(T_A)$ and the value of the derivative $\dot{R}_{xx}(T_A)$ or $\dot{R}_{yy}(T_A)$ at the fixed point $T_A$ is measured. $T_A$ denotes a shift by one sampling period duration. Since for the derivative of the autocorrelation function at the point $\tau = 0$ the following is true $$\dot{R}_{xx}(0)=0; \dot{R}_{yy}(0)=0 \quad (5)$$

an estimate can be obtained for the second derivative of the autocorrelation function which is directly proportional to the instantaneous bandwidth B of the process. Since in transport processes for the travelling time $$T_0 = k/B \sim \{\ddot{R}_{xx}(T_A)\}^{-1} \quad (6)$$

it is thus possible after once fixing the proportionality constant k to make a plausibility check of the instantaneous measured value. At the same time, approximately $$\ddot{R}_{xx}(0) \approx \ddot{R}_{xy}(T_0) \quad (7)$$

so that the amplification for the iteration algorithm can be adapted.

Modes 4 and 5:

The selection of mode 4 and 5 is again made in dependence upon the flow direction. Since $\ddot{R}_{xx}(0)$ is always greater than or equal to the second derivative at the balance point $\ddot{R}_{xy}(T0)$ in this mode the second derivative of the cross-correlation function is found:

$$\ddot{R}_{xy}(T_0) = \frac{\dot{R}_{xy}(T_0 + T_A) - \dot{R}_{xy}(T_0)}{T_A} \quad (8)$$

A better setting of the amplification is thereby possible.

Since in all cases the measurement of the correlation function takes place as regards hardware in the correlation units 30 and 31 and the microcomputer forming the computing and control circuit 24 in normal operation for updating the delay time requires only a very small proportion of its computing time, adequate computing capacity is available for monitoring and optimizing tasks.

TABLE II

| su | sv | sv̇ | ε |
|---|---|---|---|
| 1 | 1 | 1 | 0 |
| 1 | 1 | −1 | 0 |
| 1 | −1 | 1 | +2 |
| 1 | −1 | −1 | −2 |
| −1 | 1 | 1 | −2 |
| −1 | 1 | −1 | +2 |
| −1 | −1 | 1 | 0 |
| −1 | −1 | −1 | 0 |

TABLE III

| su | sv | sv̇ | A | B | ε |
|---|---|---|---|---|---|
| 1 | 1 | 1 | 0 | 0 | 0 |
| 1 | 1 | 0 | 0 | 0 | 0 |
| 1 | 0 | 1 | 1 | 0 | +2 |
| 1 | 0 | 0 | 0 | 1 | −2 |
| 0 | 1 | 1 | 0 | 1 | −2 |
| 0 | 1 | 0 | 1 | 0 | +2 |
| 0 | 0 | 1 | 0 | 0 | 0 |
| 0 | 0 | 0 | 0 | 0 | 0 |

We claim:

1. Digital correlator for determining the offset time between two random signals time-offset with respect to each other comprising an analog signal processing arrangement which by binarizing and periodic sampling of the random signals and their derivatives generates binary signals of which each represents the polarity of one of the random signals or of the derivative of a random signal at the sampling instants, and a digital signal processing unit including at least one delay circuit which imparts to one of the binary signals a delay of an adjustable multiple of the sampling period, at least one correlation unit which receives undelayed and delayed binary signals and processes them to recover estimated values of correlation coefficients, and a computing and control unit which receives the output signals of the or each correlation unit and controls the delay time in the delay circuit so that it si maintained equal to the offset time, each delay circuit being formed by a write-read memory, into the memory cells of which the consecutive bits of the binary signal to be delayed are written at the sampling rate under consecutive write memory addresses and from the memory cells of which the stored bits are read out at the sampling rate under consecutive read memory addresses differing from the write memory addresses by an adjustable address difference.

2. Digital correlator according to claim 1 in which associated with the write-read memory is an address counter whose count is changed at the sampling rate in each case by one unit, that an address difference register is provided into which the adjustable address difference is entered by the computing and control unit, that an adder circuit is provided which receives the count of the address counter and the contents of the address difference register and forms the sign-correct sum of said numerical values and that to the write-read memory the contents of the address counter are supplied as write memory address and the sum formed by the adder circuit as read memory address.

3. Digital correlator according to claim 2 in which the address counter is an up counter and the adder circuit forms the difference from the count of the address counter and the contents of the address difference register.

4. Digital correlator according to claim 2 in which the address counter is a down counter and that the adder circuit forms the sum of the count of the address counter and the contents of the address difference register.

5. Digital correlator according to claim 1 in which a clock generator is provided which generates a periodic sampling clock signal with a sampling frequency defining the sampling rate and that the sampling frequency is adjustable.

6. Digital correlator according to claim 1 in which the or each correlation unit includes a drive logic and a counting arrangement, that the drive logic receives a delayed binary signal, an undelayed binary signal and a derivative binary signal corresponding to the derivative of the undelayed binary signal and controls the counting arrangement in dependence upon a quantity calculated by forming the product of the derivative binary signal and the difference of the two other signals, the two signal values of each binary signal having associated therewith a positive numerical value and a negative numerical value and accordingly the calculated quantity being able to assume only three numerical values, of which one numerical value is positive, the other numerical value negative and the third numerical value 0, that the control of the counting arrangement by the drive logic is such that it forms in a predetermined averaging time interval corresponding to a multiple of the samling period two counts which depend on the number of sampling periods in which the calculated quantity has the positive or the negative numerical value, and that the counts reached after termination of the averaging time interval are supplied to the computing and control circuit which calculates therefrom estimated values of correlation coefficients and their derivatives.

7. Digital correlator according to claim 6 in which the counting arrangement comprises two correlation counters which are controlled by the drive logic in such a manner that the one correlation counter counts in the averaging time interval the sampling periods in which the quantity has the positive numerical value and the other correlation counter counts in the averaging time interval the sampling periods in which the quantity has the negative numerical value.

8. Digital correlator according to claim 7 in which each drive logic forms by digital linking of the binary signals applied to its inputs two binary enable signals, of which the one enable signal is applied to the enable input of the first correlation counter and has the signal value corresponding to the enabling only when the calculated quantity has the positive numerical value whilst the other enable signal is applied to the enable input of the second correlation counter and has the signal value corresponding to the enabling only when the calculated quantity has the negative numerical value and that to the counting inputs of the two correlation counters a periodic clock signal with the sampling period is applied.

9. Digital correlator according to claim 6 in which the or each correlation unit includes an averaging counter in which a count is presettable defining the averaging time interval and that to the counting input of the averaging counter a periodic clock signal with the sampling period is applied.

10. Digital correlator according to claim 6 in which the inputs of the or each correlating unit are connected to outputs of a mode selection circuit which receives at its inputs the undelayed and delayed binary signals and depending on the mode set transfers predetermined binary signals to the inputs of the or each correlation unit.

11. Digital correlator according to claim 10 in which the further inputs of the mode selection circuit are connected to the outputs of delay members which each impart a delay of one sampling period to an undelayed or a delayed binary signal.

12. Digital correlator according to claim 6 in which two correlation units are provided.

13. Digital correlator according to claim 1 in which two delay circuits are provided of which the one delay circuit delays the binary signals obtained by binarizing and sampling of the one random signal and the other delay circuit delays the binary signals obtained by binarizing and sampling of the other random signal.

* * * * *

UNITED STATES PATENT AND TRADEMARK OFFICE
CERTIFICATE OF CORRECTION

PATENT NO. : 4,817,014

DATED : March 28, 1989

INVENTOR(S) : Georg Schneider et al.

It is certified that error appears in the above-identified patent and that said Letters Patent is hereby corrected as shown below:

At column 1, line 13, please delete "dely" and insert therefor --delay--;

At column 1, line 20, please delete "tine" and insert therefor --time--;

At column 3, line 20, please delete "Form" and insert therefor --From--;

At column 3, line 42, please delete "diagrms" and insert therefor --diagrams--;

At column 3, line 63, please delete "convering" and insert therefor --covering--;

At column 4, line 13, please delete "delayred" and insert therefor --delayed--;

At column 4, line 56, please delete "ofsett" and insert therefor --offset--;

At column 4, line 64, after "10", please insert the word --and--

At column 5, line 17, please delete "circuit" and insert therefor --signal--;

At column 5, line 26, please delete "valuee" and insert therefor --value--;

UNITED STATES PATENT AND TRADEMARK OFFICE
CERTIFICATE OF CORRECTION

PATENT NO. : 4,817,014

DATED : March 28, 1989

INVENTOR(S) : Georg Schneider et al.

It is certified that error appears in the above-identified patent and that said Letters Patent is hereby corrected as shown below:

At column 10, line 11, please delete "by" and insert therefor --be--;

At column 11, line 29, please delete "$T_0$.If" and insert therefor --$T_0$. If--;

At column 13, line 26, please delete "and" and insert therefor --or mode--;

At column 14, line 16, please delete "si" and insert therefor --is--;

At column 15, line 4, please delete "samling" and insert therefor --sampling--; and At columns 11-12, please delete TABLE I and insert the following:

UNITED STATES PATENT AND TRADEMARK OFFICE
CERTIFICATE OF CORRECTION

PATENT NO. : 4,817,014
DATED : March 28, 1989
INVENTOR(S) : Georg Schneider et al.

It is certified that error appears in the above-identified patent and that said Letters Patent is hereby corrected as shown below:

TABLE I

| Mode | Correlation unit 30 | | | | | Correlation unit 31 | | | | |
|---|---|---|---|---|---|---|---|---|---|---|
| | $su_1$ | $sv_1$ | $s\dot{v}_1$ | $R_{u_1 v_1}$ | $R_{u_1 \dot{v}_1}$ | $su_2$ | $sv_2$ | $s\dot{v}_2$ | $R_{u_2 v_2}$ | $R_{u_2 \dot{v}_2}$ |
| 1 | $sx_\tau$ | $sy$ | $s\dot{y}$ | $R_{xy}(\tau)$ | $R_{x\dot{y}}(\tau)$ | $sy_\tau$ | $sx$ | $s\dot{x}$ | $R_{yx}(\tau)$ | $R_{y\dot{x}}(\tau)$ |
| 2 | $sx_\tau$ | $sy$ | $s\dot{y}$ | $R_{xy}(\tau)$ | $R_{x\dot{y}}(\tau)$ | $sy_1$ | $sy$ | $s\dot{y}$ | $R_{yy}(T_A)$ | $R_{y\dot{y}}(T_A)$ |
| 3 | $sy_\tau$ | $sx$ | $s\dot{x}$ | $R_{yx}(\tau)$ | $R_{y\dot{x}}(\tau)$ | $sx_1$ | $sx$ | $s\dot{x}$ | $R_{xx}(T_A)$ | $R_{x\dot{x}}(T_A)$ |
| 4 | $sx_\tau$ | $sy$ | $s\dot{y}$ | $R_{xy}(\tau)$ | $R_{x\dot{y}}(\tau)$ | $sx_{\tau+1}$ | $sy$ | $s\dot{y}$ | $R_{xy}(\tau+T_A)$ | $R_{x\dot{y}}(\tau+T_A)$ |
| 5 | $sy_\tau$ | $sx$ | $s\dot{x}$ | $R_{yx}(\tau)$ | $R_{y\dot{x}}(\tau)$ | $sy_{\tau+1}$ | $sx$ | $s\dot{x}$ | $R_{yx}(\tau+T_A)$ | $R_{y\dot{x}}(\tau+T_A)$ |

Signed and Sealed this

Seventh Day of November, 1989

Attest:

JEFFREY M. SAMUELS

*Attesting Officer*          Acting Commissioner of Patents and Trademarks